Aug. 29, 1933. W. LANGGUTH 1,924,996
TAILLESS AIRPLANE
Filed Jan. 23, 1932

W. Langguth
INVENTOR

By: Marks & Clark
Attys

UNITED STATES PATENT OFFICE 1,924,996

TAILLESS AIRPLANE

Wilhelm Langguth, Boblingen, in Wurtemberg, Germany

Application January 23, 1932, Serial No. 588,450, and in Germany November 16, 1929

2 Claims. (Cl. 244—12)

It is well known that, in an airplane in flight, the weight of the wings or supporting surfaces upon which the ascentional forces act in an upward direction, exerts a relieving action with respect to the bending stresses to which are subjected the spars which carry the ribs or the covering of the wings. It follows that, for a heavy wing, the absolute value of said relief action is greater than for a light wing. It has already been proposed, in order to increase the relieving action exerted by the weight of the wings, to dispose some parts of the airplane, for instance the engines, the tanks, etc., not in the fuselage, but in the wings. It has also been proposed to utilize the central portion of the wings, that is the portion located immediately adjacent the fuselage, for lodging useful loads.

The object of my invention is to produce a considerable reduction of the stresses to which the wing girders or spars are subjected, due to the fact that the useful load is disposed inside the wings, in such a manner that its weight, including the weight of the wing itself therein, may be distributed along the length of the wing in such a way as to correspond, either fully or approximately, with the distribution of the ascentional forces that act upwardly upon the wings.

To this effect, according to my invention, the useful load is preferably distributed inside the wings in such a manner that the center of gravity of any given portion of the load, for instance the portion of the load comprised between two ribs of the wing structure, may coincide, either exactly or approximately, with the ascentional resultant or lift corresponding to the portion of the supporting surface within which is located said portion of the load. In that way, the stresses to which the spars are subjected are relieved to a considerable degree by the action of the useful load. That balancing action may be such, in certain cases, for instance in airplanes without tail, that at any point along the length of the wings the ascentional forces or lift acting in an upward direction are nearly wholly compensated for or equalized by the weight of the useful load acting in an opposite direction taken in combination with the weight of the wings themselves so that only relatively small transverse or bending stresses can exist in the wing structure. In order to avoid the secondary tensile stresses which might result from the transmission of the forces of a portion of the useful load from the covering or the ribs of the wings to the girders, which are the main spar of the wing structure, the useful load may advantageously be supported directly either on or within the spars, which, to this effect, may be built in an appropriate manner. When each wing of the airplane comprises several girders, these latter are preferably connected together through a certain number of passages.

A preferred embodiment of my invention will be hereinafter described with reference to the accompanying drawing, given merely by way of example, and in which.

Figure 1:
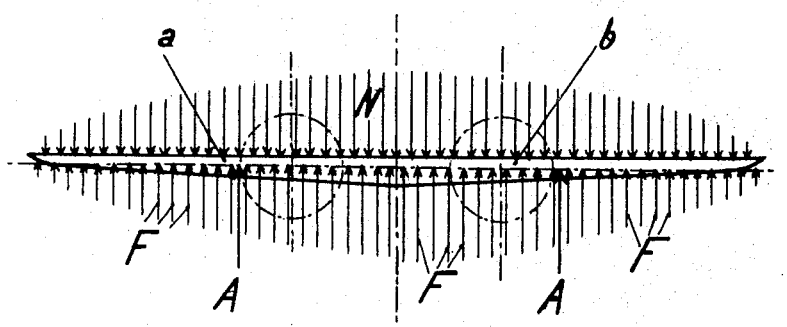
Fig. 1 is a diagrammatical front view of an airplane without tail.
Figure 2:
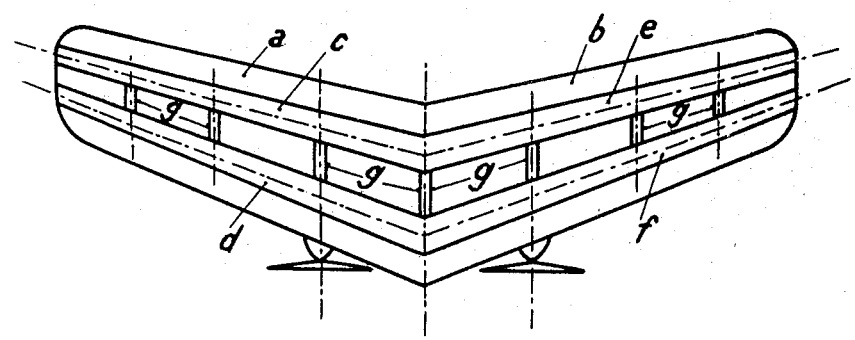
Fig. 2 is a plan view corresponding to Fig. 1.

$a$ and $b$ designate the two wings of the airplane which are supported respectively by two pairs of profiled longitudinal girders $c\,d$ and $e\,f$. The wing might as well comprise only one girder or a multiple system of spars. The girders may consist either of tubular girders or of box-shaped girders having solid walls, or again of sectional irons which are connected together by means of lattice trussing, etc. The space within the girders which constitute together a main spar is utilized, according to my invention, for receiving the useful load, which is distributed inside the wing, preferably in the vicinity of the tips of the wings, as far as the points of application of the resultant A of the ascentional forces, which are designated by F, or even further on (Fig. 1). I thus obtain the result that the forces N corresponding to the load, that is to the sum of the weight of the wings themselves and to the useful load are about equal to the ascentional forces acting in the opposite direction, at any point whatsoever along the wing. The approximation with which that result is obtained is all the more complete as the useful load is distributed beyond the resultant ascentional force, and the distribution of the load is the more uniformly adapted to the distribution of the ascentional forces.

It follows that the bending stresses to which the girders are subjected are reduced to a relatively low value, so that said spars do not need to be so strong as is customary, and that accordingly the dead weight of the airplane may be considerably reduced. As the loads on the wings resulting from the useful load act directly upon the girders or even inside the girders, secondary tensile stresses are avoided. The construction of the spars with respect to the useful load to be supported may evidently vary. The girders may be so built as to form magazines for the dead useful load or chambers for the live useful load.

In the embodiment shown in the figures, in which each wing comprises two girders c d and e f which constitute together a main spar, it is advantageous to connect the spars by means of passages so as to permit easy access from one magazine or chamber into another one. The parts of the wings or girders which, due to their small height, cannot be entered by persons, for instance the tips of the wings, are preferably used as magazines for granular or powdery goods (shipped in bulk) or liquid goods. Said spaces may also serve especially as fuel tanks.

While I have disclosed what I deem to be preferred embodiment of my invention, it should be well understood that I do not wish to be limited thereto as there might be changes made in the arrangement, disposition and form of the parts without departing from the principle of my invention as comprehended within the scope of the appended claims.

I claim:

1. A tailless airplane comprising wings, a plurality of spars in each wing adapted to be used as a magazine or chamber for the useful load, passages extending transversely with respect to said spars for connecting them together, and said load taken in combination with the weight of the wing structure being so distributed as to about correspond with the ascentional forces acting upwardly upon the wings so as to substanially balance them at any point of the surface of the wing, whereby the bending and shearing stresses exerted upon the spars are reduced to a minimum.

2. A tailless airplane comprising wings solely adapted to receive the load, propelling means secured to the wings, front and rear profiled longitudinal girders constituting together a main spar stiffening internally the surface of the wings, the load being distributed in the said girders so that the sum of the load and weight of the structure at each unit of length of the wing is approximately equal to the aerial force acting upward on the wing for creating the ascension so that this load added to the weight of the wing, known at each point, follows the same law of distribution as the distribution of the ascensional aerial force so that the shearing forces and the bending forces at each point of the wing are approximately nil.

WILHELM LANGGUTH.